(12) United States Patent
Stager

(10) Patent No.: US 6,217,270 B1
(45) Date of Patent: Apr. 17, 2001

(54) BRACING ROD WASHER ASSEMBLY AND CLAMPING WASHER

(75) Inventor: Joseph E. Stager, Valley City, OH (US)

(73) Assignee: Triangle Fastener Corporation, Pittsburgh, PA (US)

( * ) Notice: Subject to any disclaimer, the term of this patent is extended or adjusted under 35 U.S.C. 154(b) by 0 days.

(21) Appl. No.: 09/406,469

(22) Filed: Sep. 27, 1999

(51) Int. Cl.[7] .............................. F16B 33/00; F16B 43/02
(52) U.S. Cl. .......................... 411/537; 411/368; 411/540
(58) Field of Search .................................... 411/368, 379, 411/380, 381, 382, 537, 540

(56) References Cited

U.S. PATENT DOCUMENTS

| | | | |
|---|---|---|---|
| D. 268,094 | 3/1983 | Radmaker | D6/399 |
| 1,937,818 | * 12/1933 | French | 411/537 X |
| 2,358,606 | 9/1944 | Summers . | |
| 2,770,161 | * 11/1956 | Schutte | 411/537 X |
| 3,059,589 | 10/1962 | Schreyer | 104/111 |
| 3,438,300 | 4/1969 | Blom et al. . | |
| 4,012,883 | * 3/1977 | Muller | 411/537 X |

OTHER PUBLICATIONS

Pp. 35 through 42, Metal Building Systems Design and Specifications, by Alexander Newman, published by McGraw–Hill more than one year prior to the filing of this application.

Section 6–p. 20–General Erection Guide published by American Buildings Company more than one year prior to the filing date of this application.

* cited by examiner

Primary Examiner—Neill Wilson
(74) Attorney, Agent, or Firm—Andrew J. Cornelius (57) ABSTRACT

A clamping washer and washer assembly that are used to mount bracing rods or cables to the web of metal building frame columns includes a load distributing washer and a clamping washer that are fastened together on the rod or cable. The washers define matching curved, toothed bearing surfaces or seats. When the washers are clamped together, the teeth on the bearing surfaces mesh with each other to lock the clamping washer in place on the load distributing washer. The load distributing washer defines an elongated opening through which the rod or cable projects, which opening allows positioning of the rod or cable at a variety of angles with respect to the load distributing washer.

11 Claims, 7 Drawing Sheets

BRACING ROD WASHER ASSEMBLY AND CLAMPING WASHER

BACKGROUND OF THE INVENTION

The present invention relates to bracing for building frames, and, more particularly, to a washer assembly that is especially useful to secure braces to metal building frames.

Figure 1:
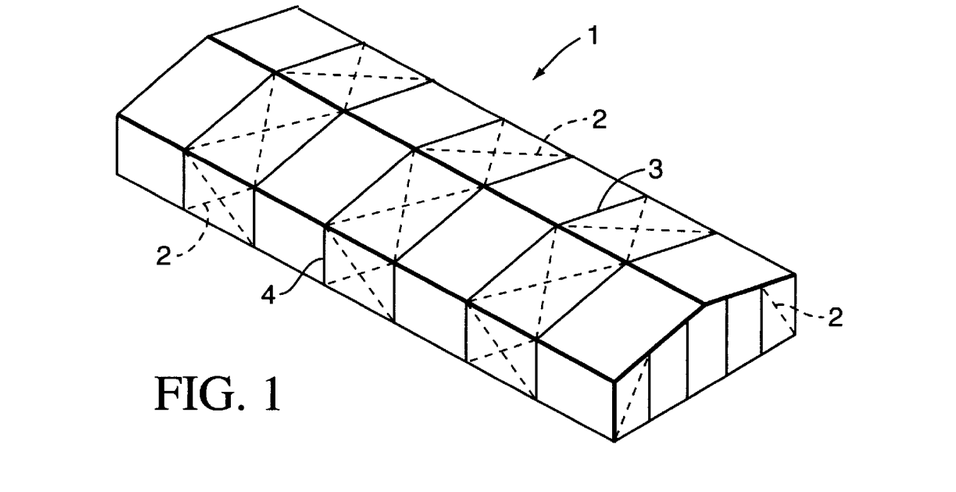
FIG. 1 is a diagrammatic view of a building frame with bracing.

Typically, the frames of metal buildings are stabilized with bracing—most often with rod or cable braces. FIG. 1 is a graphic representation of a typical metal building frame 1, with diagonal rod or cable braces 2 between the wall columns 4 and roof purlins 3 of frame 1. Braces 2 stiffen frame 1 (a) to enhance the ability of frame 1 to resist both lateral forces exerted against frame 1 by, for example, wind and earthquakes and the effects of the loads placed on frame 1 by cranes and other heavy equipment operating in frame 1, (b) to minimize building vibrations, and (c) to facilitate construction of frame 1. Concentrated loads on braces 2 are transferred by "hillside washers" directly to the webs of purlins and columns 3 and 4.

Figures 2A, 2B:
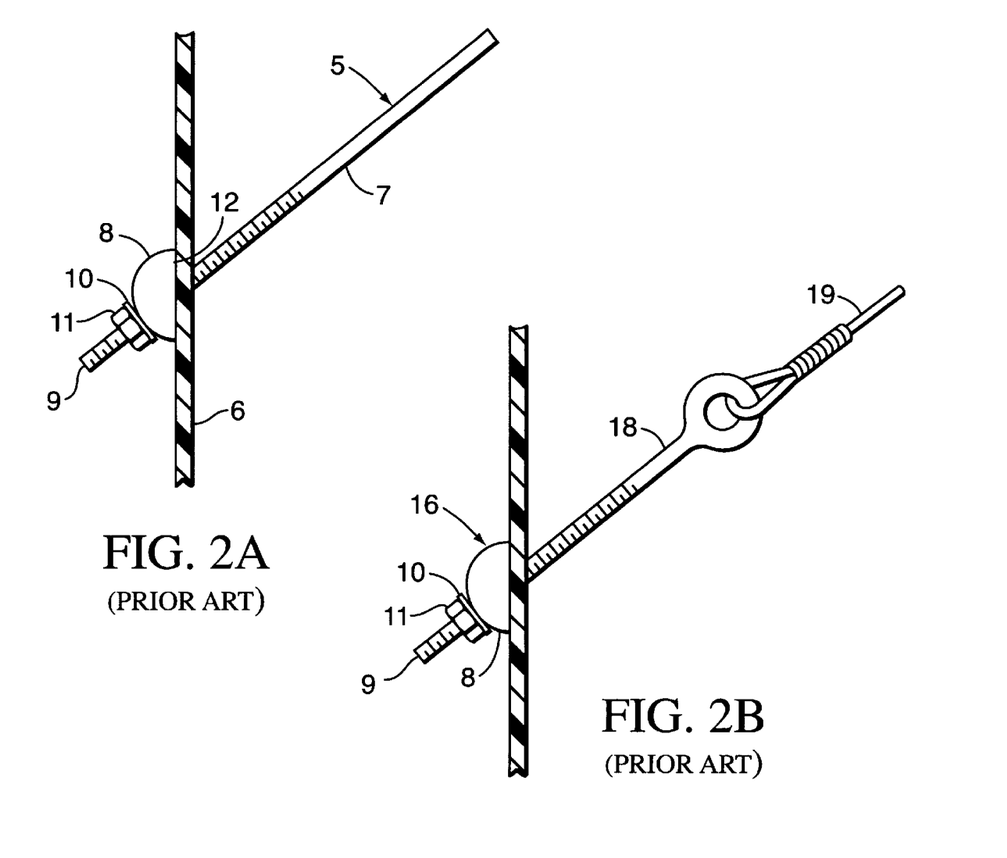
FIGS. 2A and 2B show typical known rod and cable bracing employing "hillside washers;"

FIG. 2 shows typical prior art rod and cable bracing used in the industry, which employ "hillside washers." FIG. 2A shows the details of a rod brace assembly 5 mounted to the web 6 of a vertical column 4 of frame 1. Rod brace assembly 5 includes a rod brace 7 the threaded end 9 of which is mounted to web 6 using a "hillside washer" 8, a flat washer 10, and a hex nut 11. The remaining end (not shown) of brace 7 is typically bolted diagonally to another wall column 4 or roof purlin 3 of frame 1. End 9 of brace 7 is inserted through a hole formed in web 6 to an extent that leaves a length of threaded end 9 exposed that is sufficient to permit threading of hillside washer 8, flat washer 10 and hex nut 11 onto end 9 to mount brace 7 to web 6. Hillside washer 8 allows for the transfer of the load from brace 2 to web 6 through washer 10 and nut 11.

FIG. 2B shows the details of a prior art assembly 16 that is identical to assembly 5 with the exception that assembly 16 includes an eye bolt 18, which is mounted to hillside washer 8, flat washer 10 and hex nut 11, and cable 19 instead of a brace 7. One end of cable 19 is secured through the eye of eye bolt 18.

Figure 3A:
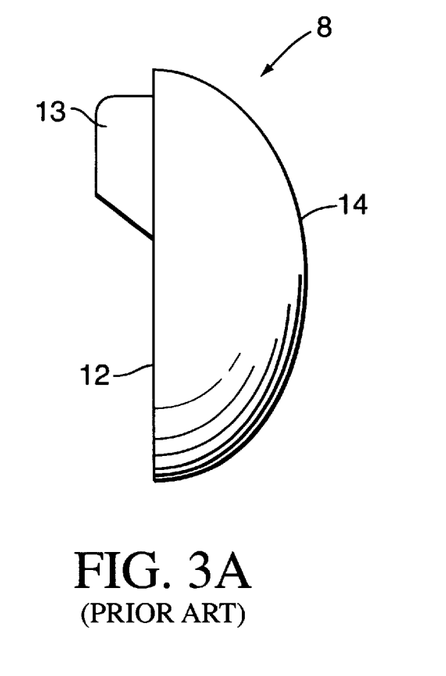
FIGS. 3A, 3B and 3C show a typical known "hillside washer;"
Figure 3B:
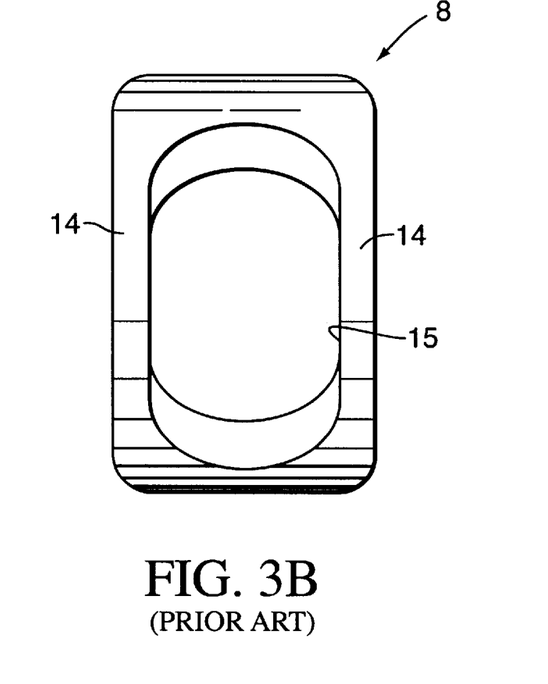
Figure 3C:
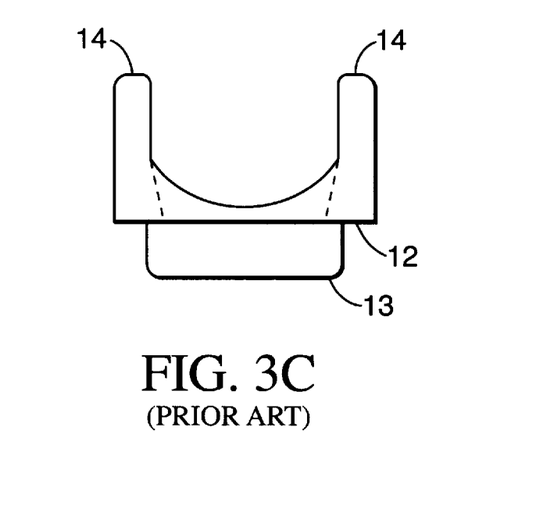

FIG. 3 shows the standard, prior art hillside washer. Washer 8 defines a tab 13 that extends through a correspondingly shaped slot formed in web 6 when washer 8 is mounted in place to stabilize the radial position of washer 8. Semicircular members 14 provide a bearing surface for washer 10 that permits mounting rod 7 at a variety of angles to web 6. Oversized opening 15 permits the mounting of rod 7 to hillside washer 8 at a variety of angles to hillside washer 8. The shape of hillside washer 8 permits it to be oriented so that flat surface 12 of hillside washer 8 bears against web 6.

Unfortunately, these assemblies often fail under load conditions. In some instances, the webs of the columns fail at the point at which the bracing is mounted to the web due to the load transferred to the web by the bracing. Also, the bearing surface between the flat washer and the hillside washer causes problems. In particular, a very small area of the hillside washer is in contact with the surface of the flat washer. Consequently, the load from the bracing is concentrated on a very small surface area of the hillside washer, which often causes the hillside washer to fracture and allow the rod to be pulled through the washer. Also, the flat washer can slip on the surface of the curved semicircular members 14, allowing unwanted movement of the bracing and building frame members. In some instances, the hillside washer itself is pulled through the web. This problem has been addressed through the use of a flat bearing plate that is positioned between the base of the hillside washer and the web, in an effort to distribute the load over a larger area of the column.

There exists, therefore, a need for a washer assembly for building frame bracing that is less prone to fracturing and that provides greater stability.

SUMMARY OF THE INVENTION

The present invention provides a two piece washer assembly that can be used to mount metal building frame reinforcements to the frame. The two piece design allows the load to which the frame is subjected to be distributed over a larger area, thus reducing the chance of web or washer assembly failure. The assembly accommodates various positions of the reinforcement with respect to the frame, and locks the reinforcement in position to minimize slippage caused by vibration or frame expansion and contraction. The assembly will accommodate bracing rods or cables of a variety of diameters.

The present invention provides a washer assembly for mounting a reinforcement to a building frame that includes a load distributing washer defining a base adapted to be seated against a surface and a curved bearing surface, and a clamping washer defining a bearing surface with a curvature that substantially matches the curvature of the seat of the load distributing washer. Accordingly, the bearing surfaces can be brought into contact with and seated against each other, providing a larger area over which the building load is distributed. Preferably, the bearing surface of the load distributing washer and the bearing surface of the clamping washer define a series of teeth. Preferably, each of the load distributing washer and the clamping washer defines an opening through which the reinforcement can project, and the opening defined by the load distributing washer is elongated.

The present invention also provides a load distributing washer including a base adapted to be seated against a surface, a curved bearing surface and an opening through which a building frame reinforcement can project. Preferably, the bearing surface defines teeth, the base is flat, and the washer includes a web that strengthens the bearing surface.

The present invention also provides a clamping washer for use with a washer assembly for mounting a reinforcement to a building frame. The clamping washer defines a bearing surface with a curvature. Preferably, the bearing surface of the clamping washer define a series of teeth, and defines an opening through which the reinforcement can project.

BRIEF DESCRIPTION OF THE DRAWING

The following detailed description of the preferred embodiment may be understood better if reference is made to the appended drawing, in which.

DETAILED DESCRIPTION OF THE PREFERRED EMBODIMENT

FIGS. 4 through 17 show a clamping washer and washer assembly provided by the present invention.

Figure 4:
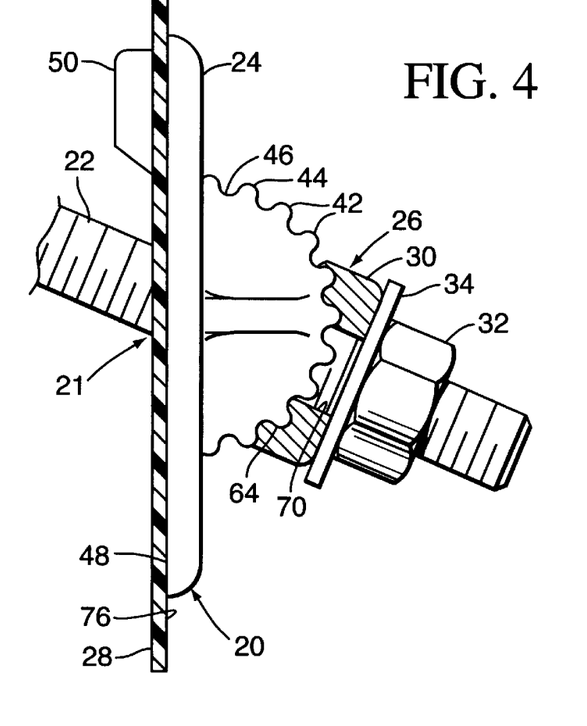
FIG. 4 is a side view of bracing employing a washer assembly provided by the present invention installed on a building frame column, the clamping washer being shown in section.
Figure 5:
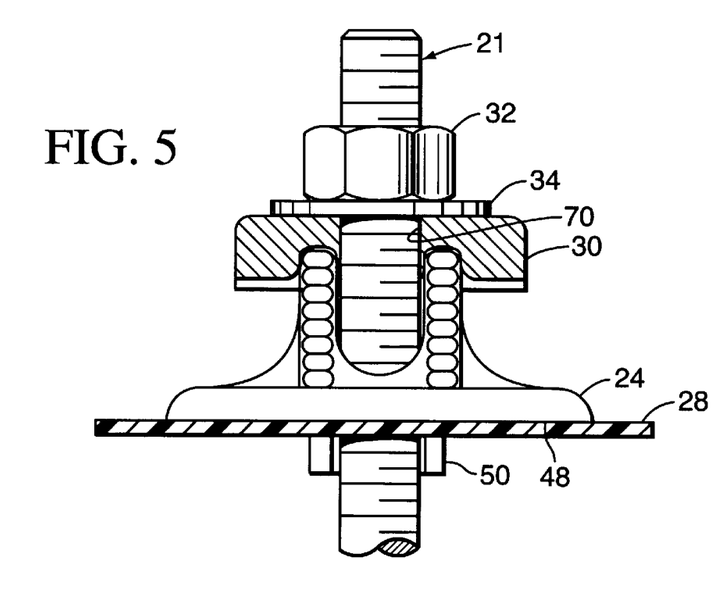
FIG. 5 is a front view bracing employing the washer assembly shown in FIG. 4 installed on a building frame column, the clamping washer being shown in section.
Figure 6:
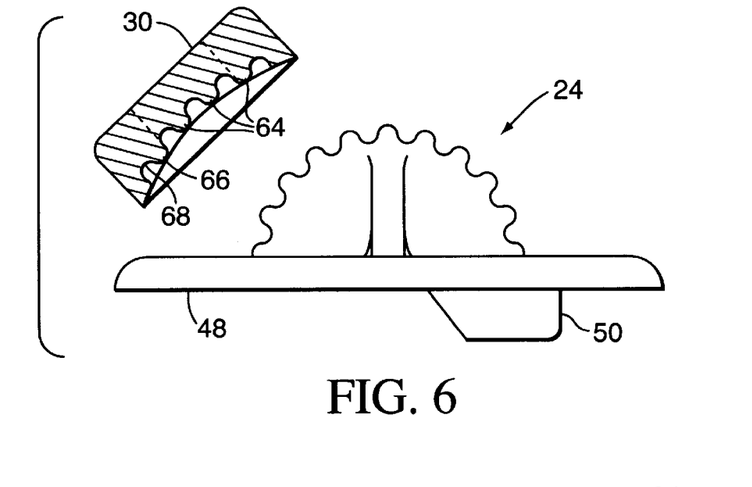
FIG. 6 an exploded side view of the load distributing washer and clamping washer of the assembly shown in FIG. 4, the clamping washer being shown in section.
Figure 7:
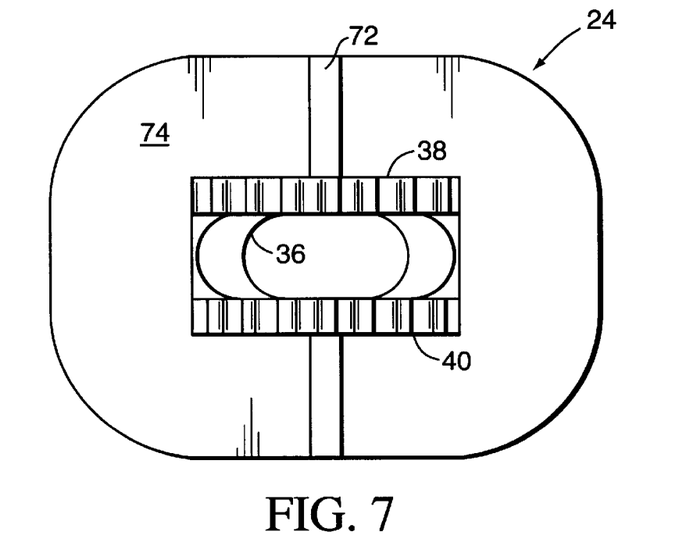
FIG. 7 is a top view of the load distributing washer of the washer assembly shown in FIG. 4.
Figure 8:
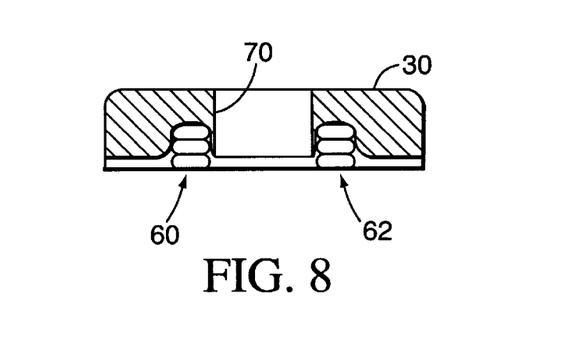
FIG. 8 is a cross sectional end view of the clamping washer shown in FIG. 4.
Figure 9:
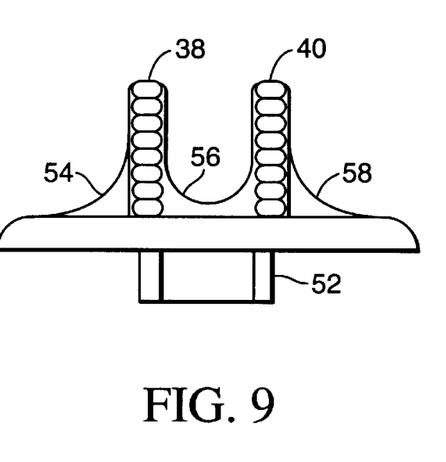
FIG. 9 is a front view of the load distributing washer shown in FIG. 4.
Figure 10:
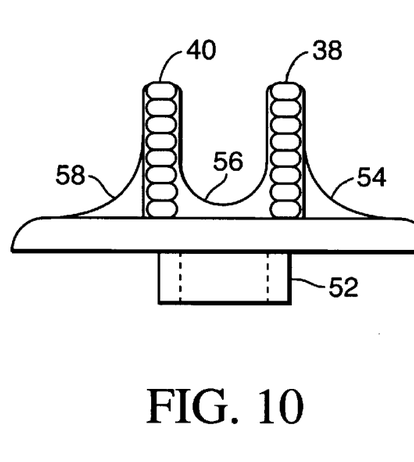
FIG. 10 is a rear view of the load distributing washer shown in FIG. 4.
Figure 11:
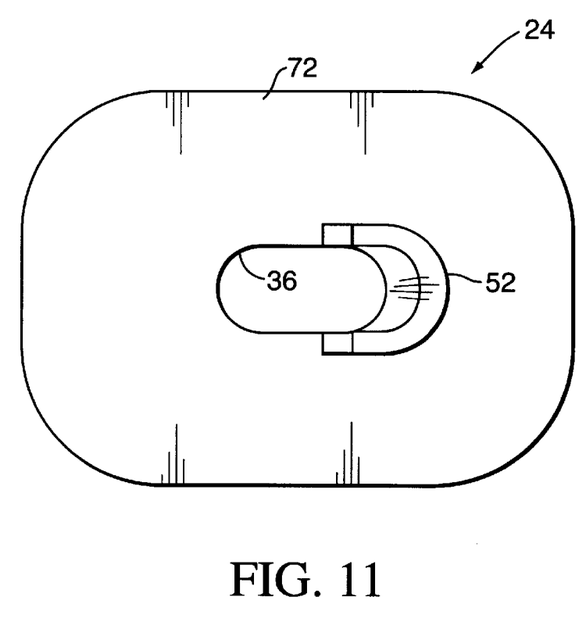
FIG. 11 is a bottom view of the load distributing washer shown in FIG. 4.
Figure 12:
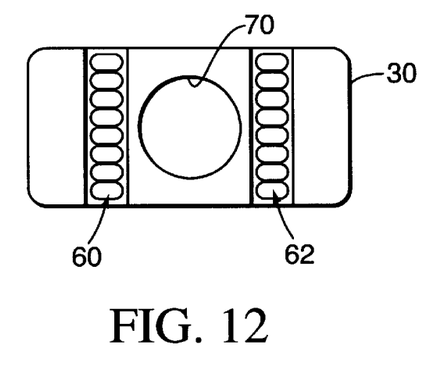
FIG. 12 is a bottom view of the clamping washer shown in FIG. 4.
Figure 13:
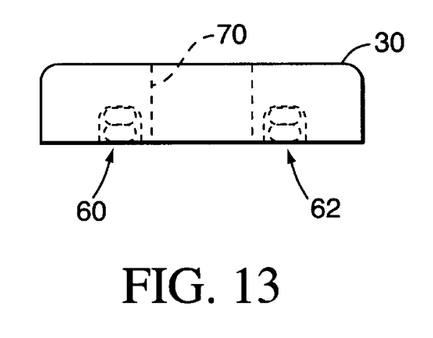
FIG. 13 is an end view of the clamping washer shown in FIG. 12.
Figure 14:
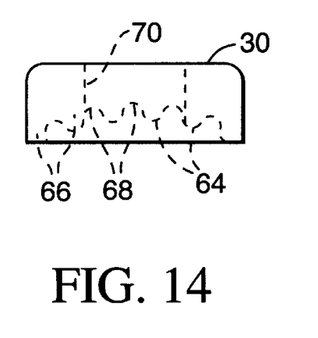
FIG. 14 is a side view of the clamping washer shown in FIG. 12.
Figure 15:
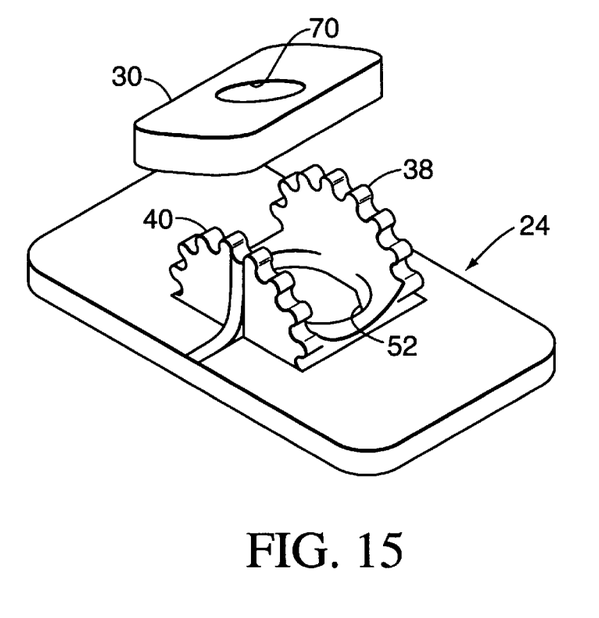
FIG. 15 is an exploded perspective view of the load distributing washer and the clamping washer shown in FIG. 4.

FIG. 4 shows bracing assembly 20, which is used to stabilize a metal building frame by mounting a metal bracing rod 21 at its ends to the web of two of the building frame columns. Accordingly, bracing rod 21 is installed at one end 22 to a web 28 of the building frame column, while the remaining end (not shown) of bracing rod 21 is mounted diagonally to the web of another frame column. Bracing assembly 20 includes a load distributing metal washer assembly 26 of a type provided by the present invention, which is used to mount bracing rod 21 to web 28. The components of washer assembly 26 preferably are injection cast using zinc or aluminum to provide strength and ductility, and to allow the components of washer assembly 26 to be produced competitively with steel casting techniques. While washer assembly 26 can be used with a variety of bracing apparatus, including rods and cables, FIGS. 4 and 5 show washer assembly 26 in use with a bracing rod 21.

Washer assembly 26 includes a load distributing washer 24, a clamping washer 30, a hex nut 32 and an optional flat washer 34. Load distributing washer 24 defines a base 72 (see FIG. 7) and an elongated opening 36 through which end 22 of rod 21 can be inserted. Base 72 distributes the load over a large area of web 28, thus reducing the chances that assembly 26 will be pulled through web 28. Because opening 36 is elongated, rod 21 can easily be positioned at a variety of angles with respect to washer 24. The width of opening 36 is such that washer 24 can accommodate bracing rods of a variety of diameters. Washer 24 also defines a pair of curved, toothed bearing surfaces or seats 38 and 40 (see FIG. 7), which extend from the upper surface 74 of base 72.

Teeth 42 are formed on each of seats 38 and 40, and define a 0.065 radius at their peaks 44 and bases 46. The diameter of each tooth 42 is 0.125". Teeth 42 can be any type of members of any shape and size that permit engagement of clamping washer 30 with washer 24. Washer 24 forms a flat undersurface 48 from which a projection 50 extends. Projection 50 defines a flange 52 (see FIGS. 9 and 10) that projects through an appropriately shaped opening (not shown) formed in web 28 when assembly 26 is mounted in place on web 28 and surface 48 engages the surface of web 28 to prevent rotation of washer 24 on web 28. Washer 24 also defines webs 54, 56 and 58, which extend from upper surface 74 of base 72 (see FIGS. 9 and 10) of washer 24 and provide structural support and stability for seats 38 and 40.

Clamping washer 30 defines curved, toothed bearing surfaces or seats 60 and 62 on its undersurface (see FIG. 5), each of which defines a series of teeth 64. Like teeth 42, each of teeth 64 defines a 0.065 radius at their peaks 66 and bases 68, and the diameter of each tooth 64 is 0.125". The curvature of seats 38 and 40 matches the curvature of seats 60 and 62 to permit the teeth 64 of seats 60 and 62 to mesh with the teeth 42 of seats 38 and 40 when washer 30 is mounted on or clamped to washer 24. Teeth 64 can be any type of members of any shape and size that permit engagement of clamping washer 30 with washer 24. Washer 30 also defines an alignment hole 70 through which end 22 of bracing rod 21 projects when assembly 20 is assembled. Hole 70 is sized for various bracing rod diameters, and to allow for optimal load distribution for each rod diameter. Seats 60 and 62 are not as long as seats 38 and 40 of washer 24. Accordingly, washer 30 can be mounted at a variety of positions along seats 38 and 40, which allows washer 30 to be positioned at various angles to base 72 of washer 24. Teeth 42 of washer 24 and teeth 64 of washer 30 also lock together to lock the rod in position to prevent potential rod slippage due to vibration or expansion or contraction. Curved seats 38 and 40 of washer 24 and seats 60 and 62 of washer 30 also provide increased bearing surface area over conventional hillside washer assemblies, which reduces the chances of washer failure.

Assembly 26 is mounted a bracing rod 21 to secure rod 21 to web 28 (see FIG. 4). End 22 of rod 21 is inserted through an opening formed in web 28 and through elongated opening 36 formed in washer 24 (see FIG. 7). Projection 50 is inserted through the opening formed in web 28, and surface 48 of washer 24 is placed against the confronting surface 76 of web 28 (see FIGS. 4 and 5). Rod 21 is positioned to form the desired angle with web 28, and washer 30 is mounted onto washer 24 by inserting end 22 of rod 21 through opening 70 of washer 30 and meshing teeth 64 of washer 30 with teeth 42 of washer 24. The angle that rod 21 forms with base 72 of washer 24 can be adjusted by changing the position of washer 30 along seats 38 and 40 of washer 24. Once washer 30 is seated on those teeth 42 of washer 24 that stabilize washer 30 at the desired angle to base 72, washer 34 can be slipped over end 22 of rod 21, if desired, and nut 32 threaded onto end 22 and tightened down on washer 30.

Figure 16:
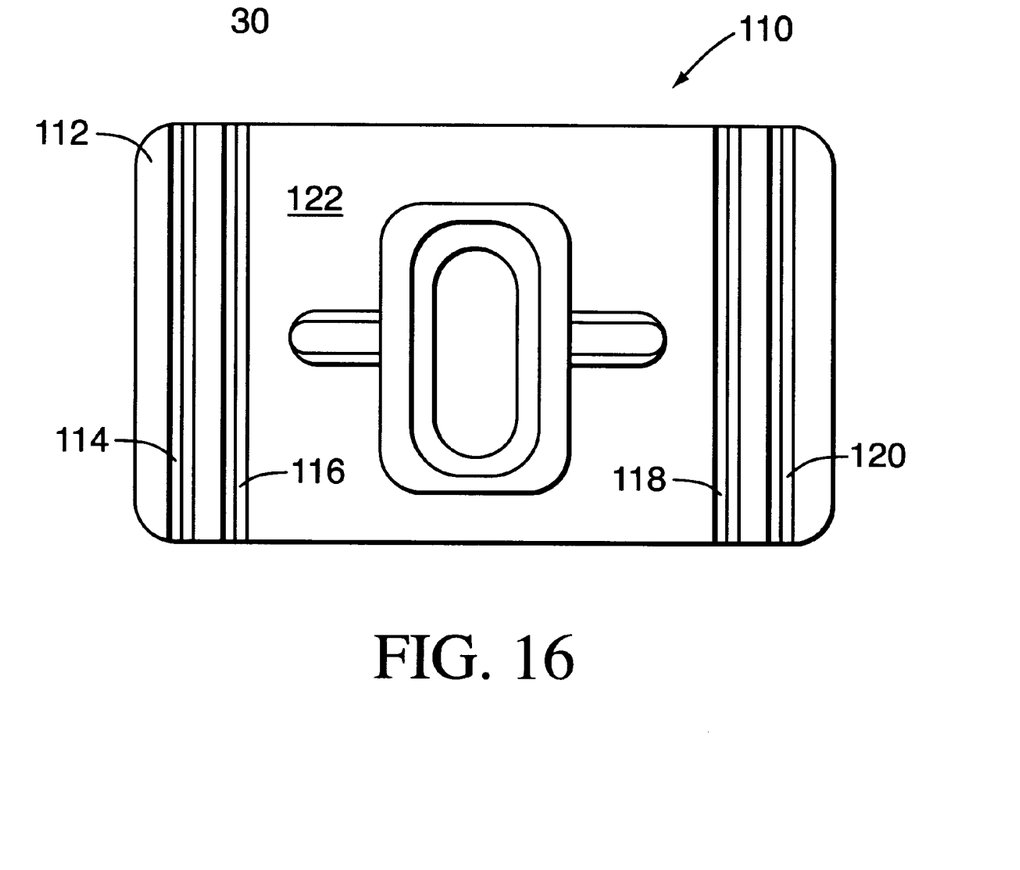
FIG. 16 is a top view of an alternate load distributing washer having a grooved base.
Figure 17:
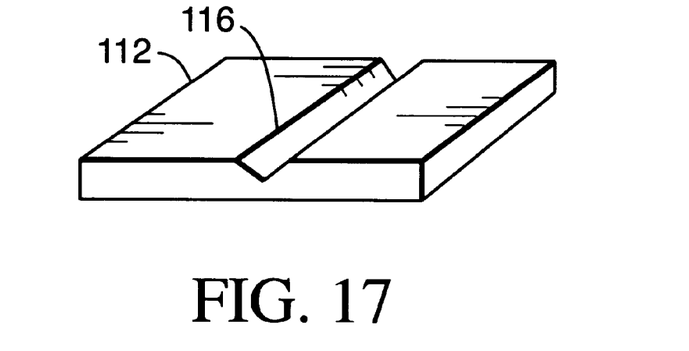
FIG. 17 is a view showing the detail of the grooves in the base of the washer shown in FIG. 16.

FIGS. 16 and 17 shows an alternate load distributing washer 110 having an extended, grooved base 112. Upper surface 120 of base 112 defines four grooves 114, 116, 118 and 120. Base 112 can be cut using snips at grooves 114, 116, 118 or 120 to provide a base with a variety of widths. For example, base 112 can be cut at grooves 114 and 120 to provide a 4½ inch wide base 112, or at grooves 116 and 118 to provide a 4 inch wide base 112. Base 112 when uncut is 5 inches wide. Accordingly, by cutting different sets of grooves 114, 116, 118 and 120, base 112 can be fit to webs 28 of various sizes, thereby improving the distribution of load into web 28.

What is claimed is:

1. A washer assembly for mounting reinforcement to a building frame comprising:

a load distributing washer defining a base adapted to be seated against a surface and a curved bearing surface; and a clamping washer defining a bearing surface with a curvature that substantially corresponds to the curvature of said bearing surface of said load distributing washer;

whereby said bearing surfaces can be brought into contact with and seated against each other.

2. The assembly recited by claim 1 wherein said bearing surface of said load distributing washer and said bearing surface of said clamping washer define a series of teeth.

3. The assembly recited by claim 1 wherein each of said load distributing washer and said clamping washer defines an opening through which the reinforcement can project, and wherein said opening defined by said load distributing washer is elongated.

4. A washer assembly for mounting reinforcement to a building frame comprising:

a load distributing washer defining a base adapted to be seated against a surface and a curved bearing surface; and a clamping washer defining a bearing surface with a curvature that substantially corresponds to the curvature of said seat of said load distributing washer;

said clamping washer including means for engaging at least a part of said bearing surface of said load distributing washer to prevent slippage of said clamping washer along said bearing surface of said load distributing washer.

5. A load distributing washer comprising a base adapted to be seated against a surface, a curved bearing surface and an opening through which a building frame reinforcement can project, said bearing surface defining teeth.

6. The washer recited by claim 5 wherein said base is flat.

7. The washer recited by claim 6 further comprising a web that strengthens said bearing surface.

8. A washer assembly for mounting reinforcement to a building frame comprising:

a load distributing washer defining a flat base, a curved, toothed bearing surface, and an elongated hole through which the reinforcement can project, said hole being sized to allow reinforcements of a variety of diameters to project through said hole;

a clamping washer defining a toothed bearing surface with a curvature that substantially matches the curvature of said seat of said load distributing washer, the teeth defined by said bearing surface of said clamping washer being configured and disposed to permit their engagement with the teeth defined by said bearing surface of said load distributing washer, said clamping washer defining a hole through which the reinforcement can project, said hole being sized to allow reinforcements of a variety of diameters to project through said hole;

a fastener for securing said washers to each other at said bearing surfaces, and to the reinforcement; and a projection defined by and projecting away from said base, said projection being adapted to project through an opening in the building frame to prevent said load distributing washer from rotating with respect to the frame.

9. A clamping washer for use with an assembly for mounting reinforcement to a building frame, the assembly including a load distributing washer defining a base adapted to be seated against a surface and a curved bearing surface, said clamping washer defining a bearing surface with a curvature that substantially corresponds to the curvature of the bearing surface of the load distributing washer;

whereby the bearing surfaces can be brought into contact with and seated against each other.

10. The assembly recited by claim 9 wherein said bearing surface of said clamping washer defines a series of teeth.

11. A clamping washer comprising a base defining an opening through which a reinforcement can project and a bearing surface with a curvature that defines a series of teeth.

* * * * *

UNITED STATES PATENT AND TRADEMARK OFFICE
CERTIFICATE OF CORRECTION

PATENT NO. : 6,217,270 B1  
DATED : April 17, 2001  
INVENTOR(S) : Joseph E. Stager It is certified that error appears in the above-identified patent and that said Letters Patent is hereby corrected as shown below:

<u>Title page,</u>  
In the section entitled "References Cited" under the heading "OTHER PUBLICATIONS" please insert:  
-- Triangle Fastener Corporation Drawing No: AP3, showing a washer assembly that was in use and/or on sale in this country more than one year prior to the filing date of this application --  
-- Triangle Fastener Corporation Drawing No: PD1, showing a washer that was in use and/or on sale in this country more than one year prior to the filing date of this application --

Signed and Sealed this

Twenty-third Day of April, 2002

*Attest:*

*Attesting Officer*

JAMES E. ROGAN  
*Director of the United States Patent and Trademark Office*